United States Patent [19]

Imai et al.

[11] 4,303,323
[45] Dec. 1, 1981

[54] FOCUS CORRECTING DEVICE FOR USE IN A RANGEFINDER CAMERA

[75] Inventors: Toshihiro Imai; Toyotaka Yamada, both of Hachioji, Japan

[73] Assignee: Olympus Optical Company Ltd., Tokyo, Japan

[21] Appl. No.: 158,924

[22] Filed: Jun. 12, 1980

[30] Foreign Application Priority Data

Jul. 6, 1979 [JP] Japan .................................. 54/85723

[51] Int. Cl.³ ............................................ G03B 13/20
[52] U.S. Cl. ................................................... 354/166
[58] Field of Search ............................... 354/162–164, 354/167, 168, 166, 199, 224, 225

[56] References Cited

U.S. PATENT DOCUMENTS 1,987,765 1/1935 Wandersleb ......................... 354/162
2,108,751 2/1938 Küppenbender .................... 354/168
3,044,380 7/1962 Baur ..................................... 354/166

FOREIGN PATENT DOCUMENTS 868106 3/1953 Fed. Rep. of Germany ...... 354/163

Primary Examiner—Donald A. Griffin
Attorney, Agent, or Firm—Weinstein & Sutton

[57] ABSTRACT

A focus correcting device for use in a rangefinder camera is operable to correct for a displacement of the focal point of an imaging optics which results from a change in the diaphragm aperture of an apertured diaphragm. An interlocking mechanism operationally couples a rangefinder with a focus adjusting mechanism of the imaging optics. Means is disposed in the interlocking mechanism or the focus adjusting mechanism to correct for a displacement of the focal point as the particular diaphragm aperture is established.

5 Claims, 15 Drawing Figures

FIG. 4
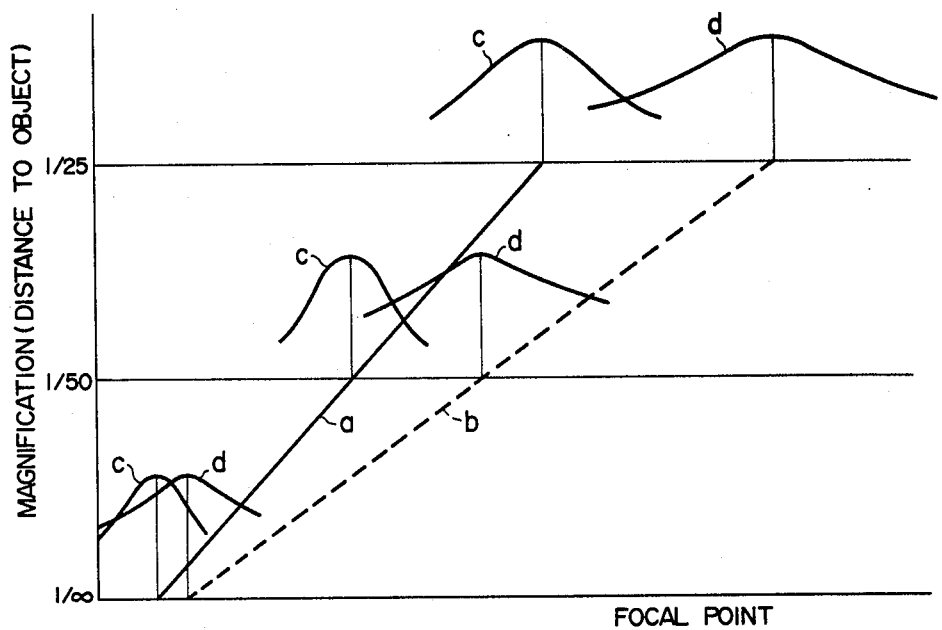
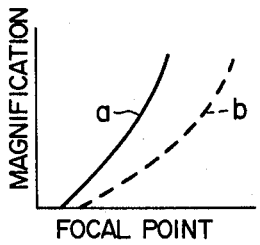
FIG. 5
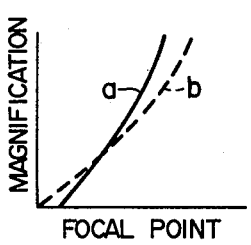
FIG. 6
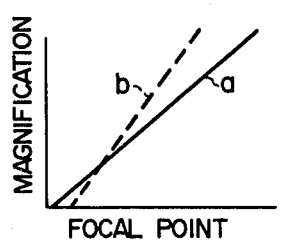
FIG. 7
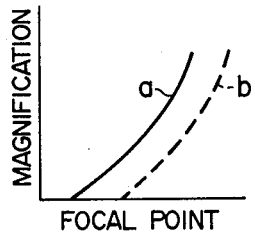
FIG. 8
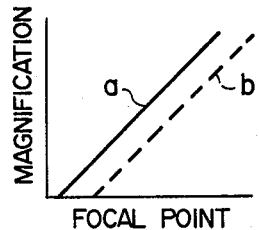
FIG. 9

FOCUS CORRECTING DEVICE FOR USE IN A RANGEFINDER CAMERA

BACKGROUND OF THE INVENTION

The invention relates to a focus correcting device for use in a rangefinder camera in which a focussing operation is achieved by an interlocked movement of a rangefinder including its own optics and a focus adjusting mechanism.

As is well recognized, a rangefinder camera includes a rangefinder having its own optics which is utilized to determine a distance to an object being photographed by triangulation, and a focus adjusting mechanism associated with an imaging optics, both of which are connected together so that the object in focus is detected within the field of view of the rangefinder by translating the imaging optics as a distance adjusting ring is turned. Thus, in contradistinction to a single lens reflex camera in which the imaging optics is translated to achieve an in-focus condiition directly, the rangefinder camera requires a mechanism which provides an operational coupling between the rangefinder and the focus adjusting mechanism of the imaging optics.

An exemplary arrangement of a rangefinder and a focus adjusting mechanism of an imaging optics in a conventional rangefinder camera will be described with reference to FIGS. 1 to 3. FIG. 1 shows the optics of a rangefinder, which is formed with a pair of objective windows which are spaced apart by a given distance so that images introduced through the both windows are led into a common field of view in order to determine a distance to an object being photographed by the overlapping relationship of the both images. Referring to FIG. 1, light from an object R being photographed which is incident through one of the objective windows passes through an objective lens 1 and a fixed half mirror 2 to impinge on an eyepiece 3. Light from the object R which is incident on the other window is reflected by a rotatable mirror 4, which is pivotally mounted on a point Q, onto the fixed half mirror 2 and thence reflected to the eyepiece 3. An auxiliary lens 5 is disposed intermediate the half mirror 2 and the rotatable mirror 4.

In the optical arrangement described, when it is focussed to infinity, the rotatable mirror 4 is disposed in parallel relationship with the half mirror 2, with an angle of inclination of 45° with respect to a line joining the points P and Q. In order to determine the distance to the object R which is located at a finite distance, the mirror 4 is rotated until the two images which can be viewed through the eyepiece 3 coincide with each other so that the taking lens is automatically brought to its focussed position, namely, focussed onto the film surface, when the distance to the object R is determined. In this Figure, the distance $d_0$ to the object is expressed in terms of the angle $\theta$ of rotation of the rotatable mirror 4 and the length of the base line l;

$$d_0 \approx l/2\theta$$

FIG. 2 shows an exemplary mechanism which provides an interlocked connection between the rangefinder described and a focus adjusting mechanism of an imaging optics. Specifically, the imaging optics includes a plurality of lenses 6a, 6b, 6c which are carried by a lens barrel 7 which is in turn slidably fitted into a fixed sleeve 9 secured to a camera body 8. The barrel 7 fixedly carries a distance adjusting pin 10 which fits in an inclined slot 9a (see FIG. 3) formed in the fixed sleeve 9, so that as a distance adjusting ring, not shown, is rotated, the pin 10 angularly moves around the optical axis of the lenses to cause a movement of the lenses 6a to 6c in the direction of the optical axis in accordance with the constraint defined by the slot 9a. An apertured diaphragm 11 is disposed within the barrel 7, and its position is controlled by a diaphragm setting member, not shown, to provide a desired diaphragm aperture.

An interlocking pin 12 is secured to the rear end of the lens barrel 7, and has its free end 12a disposed in abutment against one end 13a of a connecting lever 13 which is pivotally mounted on a pin 14. A coiled spring 15 normally urges the lever 13 to rotate counter-clockwise about the pin 14. Consequently, the end 13a is maintained in abutment against the free end 12a of the pin 12. A pin 16 is fixedly mounted on the other end of the connecting lever 13, and is maintained in abutment against the edge 17a of a rotatable arm 17 adjacent to one end thereof. A hollow shaft 18 is fixedly mounted in the other end of the arm 17, and is tightly fitted over a support shaft 19. A coiled spring 20 urges the arm 17 to rotate clockwise about the shaft 19, whereby the edge 17a is maintained in abutment against the pin 16. The rotatable mirror 4 which forms part of the rangefinder optics is fixedly mounted on the hollow shaft 18 which is adapted to rotate integrally with the arm 17.

In the conventional mechanism thus constructed, when a distance adjusting ring, not shown, is turned for the purpose of focussing, the barrel 7 which carries the lenses 6a-6c moves either forwardly or rearwardly in the direction of the optical axis, whereby the interlocking pin 12 which is connected therewith moves in the direction of the optical axis, as indicated by a double-headed arrow A. In response thereto, the connecting lever 13 angularly moves about the pin 14 to cause an angular movement of the rotatable arm 17, which is maintained in abutment against the pin 16 on the lever 13, about the shaft 19. The hollow shaft 18 which is integral with the arm 17 fixedly carries the rotatable mirror 4, and hence the angle through which the arm 17 moves directly represents the angle of rotation of the rotatable mirror 4. Assuming that the connecting pin 12 moves forwardly, as viewed in FIG. 2, to thereby carry the lenses 6a-6c forwardly therewith, the connecting lever 13 and the rotatable arm 17 turn counter-clockwise, as indicated by arrows B, C. Conversely, when the interlocking pin 12 moves rearwardly, the lever 13 and the arm 17 turn clockwise. Since the connecting lever 13 and the rotatable arm 17 are urged by respective springs 15, 20 to follow the movement of the interlocking pin 12 in a precise manner, it is assured that the fore-and-aft movement of the lenses 6a-6c is positively transmitted to the rotatable mirror 4.

As an alternative, a helicoid system may be employed to move the barrel 7. However, whatever system is employed to move it, a mechanism which provides an interlocking connection between the rangefinder and the focus adjusting mechanism of the imaging optics is constructed to cause an angular movement of the rotatable mirror in response to a movement of the taking lenses, in the similar manner as described above in connection with the illustrated interlocking mechanism.

It will be appreciated that a taking lens which constitutes the imaging optics contains a spherical aberration, which causes an optimum focal point to be displaced in response to a change in the F-number (aperture ratio) corresponding to the choice of a diaphragm setting. In addition, the focal point is also displaced in accordance with a distance to an object being photographed.

Considering this more specifically, FIGS. 4 to 9 graphically show the relationship between a magnification taken on the ordinate (the distance to an object being photographed) and the focal point taken on the abscissa, with varying values of the aperture ratio of the imaging optics chosen as a parameter. A characteristic curve a shown in solid line represents a displacement of the focal point when the diaphragm is open while a characteristic curve b shown in broken lines represents a displacement of the focal point when the diaphragm aperture is partly reduced, for example, reduced by two steps.

The focal point of the imaging optics is displaced in accordance with a variation in the diaphragm value. Depending on the magnification, the displacement of the focal point may change linearly as shown in FIG. 4. Alternatively, it may change non-linearly as indicated in FIGS. 5 to 7. As a further alternative, the displacement of the focal point with a change in the diaphragm value may remain constant regardless of the magnitude of the magnification, as illustrated in FIGS. 8 and 9. In FIG. 4, chevron-shaped curves c, d represent the lens performance, exhibiting the best performance at the peak. Where the diaphragm is changed by two steps, the depth of focus increases to substantially twice its original value.

In this manner, in the imaging optics, the focal point is displaced in various ways depending on the diaphragm value or F-number principally because of the spherical aberration of the imaging optics.

In a conventional imaging optics, the optical system is designed so that the displacement of the focal point is limited within the depth of field and the depth of focus.

However, in a conventional rangefinder camera which has been described above in connection with FIGS. 1 to 3 and in which the rangefinder is interlocked with the focus adjusting mechanism of the imaging optics, the imaging optics is designed to provide the best focus exactly upon the film surface when the diaphragm aperture is open. If the aperture is reduced, the taking lens may not be accurately focussed upon the film surface and thus is defocussed strictly speaking, even though doubled images coincide with each other in the rangefinder.

Such defocussed condition may be corrected by causing the taking lens to move slightly in the direction of the optical axis. However, when so corrected, since the rangefinder is precisely interlocked with the imaging optics, doubled images within the rangefinder cannot be brought into coincidence with each other, thus presenting a difficulty.

Thus it will be seen that it has been a problem in the prior art of optical instruments such as cameras to provide means which achieves a precise optical focussing of an imaging optics which is subject to an increased displacement of the focal point in response to a reduced diaphragm aperture. In the case of an optical system which is provided with the rangefinder, various attempts and studies have been made including an improvement of an interlocking mechanism between a rangefinder and a focussing movement of a taking lens, a remedy to compensate for a displacement of the focal point in response to a change in the F-number. In particular, if it is possible to achieve an accurate focussing through a displacement of the focal point in accordance with the F-number, a defocussing condition which results from a change in the diaphragm value can be avoided, allowing the achievement of an excellent lens performance to be expected.

SUMMARY OF THE INVENTION

It is an object of the invention to satisfy the need in the prior art, by providing a focus correcting device for use in a rangefinder camera which permits an accurate focussing operation to be achieved for each diaphragm value in an imaging optics which is subject to an increased displacement of a focal point in response to a change in the diaphragm value and which also permits an in-focus condition to be detected by the rangefinder in a similar manner as in the conventional arrangement.

In accordance with the invention, an interlocking mechanism which provides an operational connection between a rangefinder and a focus adjusting mechanism of an imaging optics includes a correction member disposed therein which adjusts a start position for the angular movement of a rotatable mirror in response to an aperture setting of an apertured diaphragm. The mere provision of the correction member effectively allows a correction of the focal point. Consequently, there is provided a focus correction device which avoids the need for a complicated construction and which is economically advantageous.

According to another embodiment of the invention, an arrangement is made in the focus adjusting mechanism of the imaging optics which is interlocked with the rangefinder so that a diaphragm ring which is used to preset a diaphragm aperture may be used to cause a movement of the lens in the imaging optics regardless of the distance ring, thereby allowing a displacement of the focal point which is caused by a diaphragm setting to be automatically compensated for. In this manner, there is provided a focus correcting device which effectively achieves a correction for the displacement of the focal point without requiring any manual operation therefor.

BRIEF DESCRIPTION OF THE DRAWINGS

FIGS. 4 to 9 graphically show a displacement of a focal point of the imaging optics which is caused by a change in the diaphragm value, with the focal point being shown on the abscissa and the magnification on the ordinate;

DESCRIPTION OF PREFERRED EMBODIMENTS

Figure 10:
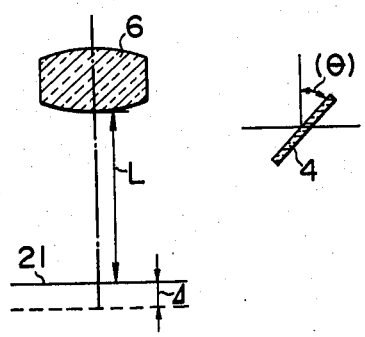
FIG. 10 is a schematic view illustrating the principle of the invention.

Referring to FIG. 10, the basic principle of the invention will be described first which enables the relative position between a rotatable mirror 4 and a taking lens 6 to be changed in accordance with a change in the F-number or diaphragm value. Assuming that an object to be photographed is at a given distance from the taking lens 6, the angle $\theta$ which the rotatable mirror 4 forms with the optical axis is determined in accordance with a distance to an object being photographed as the distance is adequately determined by the interlocked rangefinder. The taking lens 6 will be located at a given distance L from a film surface 21 in a manner corresponding to the angle $\theta$. When a diaphragm value (F-number) is changed while maintaining this condition, the focal point will be displaced in a corresponding manner. Representing the displacement by $\Delta$, a defocussed image will be formed on the film surface 21 unless the taking lens 6 is moved to compensate for the displacement $\Delta$. The compensation can be simply achieved by forwardly moving the taking lens 6. However, this will result in an angular movement of the rotatable mirror 4 which is interlocked with the taking lens 6. Since the rangefinder has nothing to do with a particular diaphragm value, an angular movement of the rotatable mirror 4 represents a defocussed condition for the rangefinder. This is because the angle of rotation $\theta$ is determined in accordance with the distance to an object being photographed. Hence, with a rangefinder of the type in which doubled images are brought into coincidence, the doubled images within the rangefinder will be offset slightly from each other as the compensation is made. This cannot provide a correction in accordance with the distance. To enable a correction of the focal point for any distance, there must be provided a correcting device which permits the distance L between the film surface 21 and the lens 6 to be equal to an amount $(L+\Delta)$ when the doubled images coincide with each other within the rangefinder. When this correction is achieved, it means that the relationship $\theta \rightleftarrows L$ for an open diaphragm is modified into the relationship $\theta \rightleftarrows L+\Delta$ for a particular diaphragm value. Thus, the optimum focal point is established on the film surface irrespective of any diaphragm value. The invention is constructed to operate on the basis of such principle.

Figure 2:
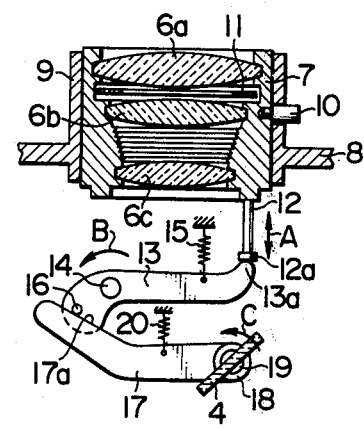
FIG. 2 is a plan view of a conventional interlocking mechanism which is provided between a rangefinder and a focus adjusting mechanism of an imaging optics.
Figure 3:
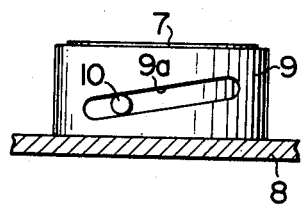
FIG. 3 is a side elevation of a lens barrel and a fixed sleeve shown in FIG. 2.
Figure 11:
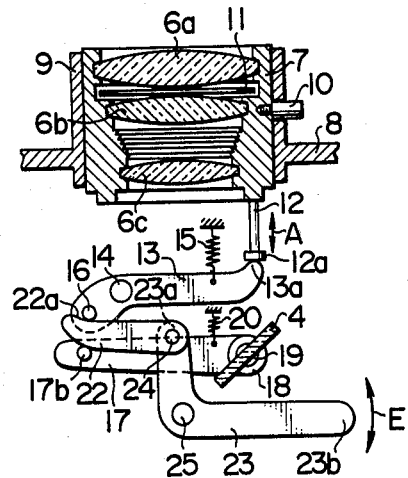
FIG. 11 is a plan view of a focus correcting device for a rangefinder camera which is constructed according to one embodiment of the invention.

FIG. 11 shows an embodiment of the invention in which a focus correcting device is disposed in an interlocking mechanism provided between a rangefinder and a focus adjusting mechanism of an imaging optics. In the present embodiment, an angular movement of the rotatable mirror 4 provides a correction for a displacement $\Delta$ of the focal point. The interlocking mechanism itself is the same as shown in FIG. 2. Consequently, parts of the interlocking mechanism which corresponds to those shown in FIG. 2 are designated by like reference characters, without repeating their description.

The correcting device of the invention which is disposed in the interlocking mechanism comprises a correction member 22 which is adapted to move as a particular value of an apertured diaphragm 11 is set. The correction member 22 is in the form of an arm which has its one end pivotally mounted on a connecting pin 24 which is in turn fixedly mounted on one end 23a of an interlocking lever 23. Adjacent to the free end and on one side thereof, the arm is formed with a cam profile 22a, and is adapted to move into or out of the space between the coupling pin 16 on the connecting lever 13 and a rotation pin 17b fixedly mounted on the free end of a rotatable arm 17. The cam profile 22a is shaped in a manner corresponding to the optical response of the imaging optics or the lenses 6a-6c. In the present embodiment, the cam profile 22a is disposed in contact with the pin 16, but the cam profile 22a may be formed on the free end of the correction member 22 for abutment against the rotation pin 17b. Alternatively, it may be formed on the opposite edges of the correction member 22 adjacent to the free end thereof.

The interlocking lever 23 which carries the correction member 22 on its end 23a is L-shaped in configuration, and is pivotally mounted on a stationary pin 25. The other end 23b of the interlocking lever 23 is connected to a diaphragm ring, not shown, which represents a diaphragm value presetting member. The diaphragm ring is disposed so as to be rotatable about the optical axis of the lens for establishing a particular aperture value of the diaphragm 11. As a particular diaphragm aperture is established, the interlocking lever 23 angularly moves in a direction indicated by a double-headed arrow E.

In operation, when the diaphragm ring is turned to established a desired diaphragm value or F-number for the diaphragm 11, the interlocking lever 23 turns counter-clockwise, for example, about the pin 25. Consequently, the correction member 22 moves to the left, as viewed in FIG. 11, and a portion of the cam profile 22a which is spaced from the free end thereof to be located between the pins 16, 17b, whereby the spacing between these pins varies. At this time, the lens barrel 7 remains stationary, and hence a rotatable arm 27 moves counter-clockwise to cause an angular movement of the rotatable mirror 4. In this manner, the relationship between $\theta$ and L can be changed. The described operation corresponds to a correction when the diaphragm aperture is changed from a smaller to a larger value. When the diaphragm aperture is changed in the opposite direction, the lever 23, the arm 17 and the correction member 22 move in the opposite directions.

Figure 12:
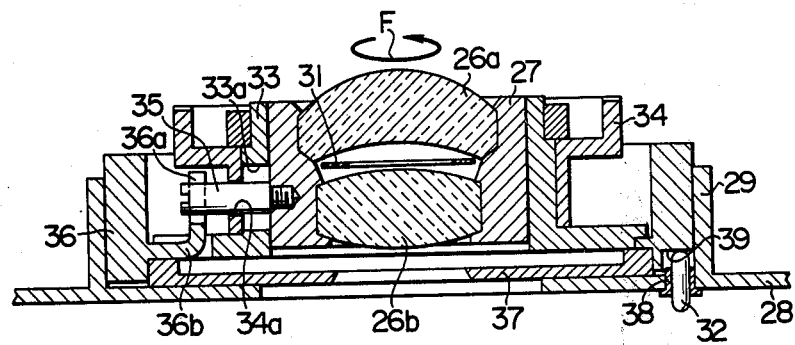
FIG. 12 is a cross section of a focus correcting device according to another embodiment of the invention.

FIG. 12 shows another embodiment of the invention in which a focus correcting device is disposed in a focus adjusting mechanism of an imaging optics which is interlocked with a rangefinder. In this embodiment, a displacement of the focal point is compensated for by a movement of the taking lens through a distance which depends on the diaphragm value.

Figure 13:
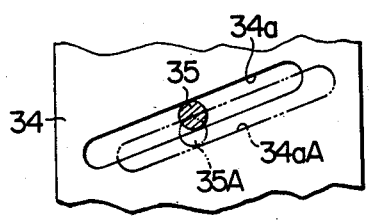
FIG. 13 is a fragmentary side elevation of a diaphragm ring and a coupling pin shown in FIG. 12.

Referring to FIG. 12, a lens barrel 27 carries lenses 26a, 26b which define an imaging optics, and is slidably fitted into an inner frame 33. A suitable guide mechanism is formed on each of the lens barrel 27 and the frame 33 to permit the lens barrel 27 to move within the frame 33 in the direction of the optical axis. A diaphragm ring 34 which is rotatable about the optical axis is disposed outside the inner frame 33, and can be turned to establish a desired diaphragm value for an apertured diaphragm 31 which is disposed inside the barrel 27. The diaphragm ring 34 is partly formed with an inclined slot 34a (see FIG. 13) which is engaged by a coupling pin 35 secured to the barrel 27 and projecting laterally therefrom and extending through an opening 33a formed in the frame 33. The head of the coupling pin 35 is fitted into a fork 36a which is integrally formed on a distance ring 36.

The distance ring 36 is rotatably fitted inside a fixed sleeve 29 secured to a camera body 28, at a location outside the diaphragm ring 34 and the inner frame 33.

Figure 14:
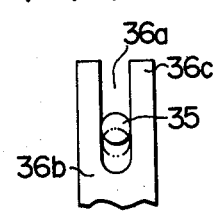
FIG. 14 is a fragmentary side elevation of a distance ring and a coupling pin shown in FIG. 12.

The fork 36a is defined by an upright portion 36c of an L-shaped element 36b which extends inwardly from the distance ring (see FIG. 14). In FIG. 12, numeral 37 represents a mounting plate which is utilized to fix the frame 33 to the camera body 28.

Figure 15:
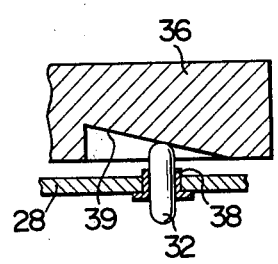
FIG. 15 is a fragmentary cross section of a distance ring and an interlocking pin shown in FIG. 12.

The focus adjusting mechanism of the imaging optics which is thus constructed is connected to the interlocking mechanism with the rangefinder (see FIG. 2) by means of an interlocking pin 32. The interlocking pin 32 corresponds to the interlocking pin 12 shown in FIG. 2, and is disposed in a guide tube 38, secured to the camera body 28, so as to be movable in the direction of the optical axis. The free end of the interlocking pin 32 fits in an inclined groove 39 formed in the distance ring 36 (see FIG. 15). The inclined groove 39 is formed so that its bottom is inclined in the direction of the optical axis. The other end of the interlocking pin 32 is normally urged by a connecting lever of the interlocking mechanism so that the free end is maintained in abutment against the bottom of the inclined groove. Consequently, as the distance ring 36 is turned, the interlocking pin 32 moves in the direction of the optical axis according to the configuration of the inclined groove bottom, thus causing an angular movement of the rotatable mirror in the rangefinder.

In operation, assuming that the apertured diaphragm 31 assumes a position in which the aperture is reduced by two steps, as the aperture is changed to its fully open condition, the focal point will be displaced forwardly. Hence, the taking lenses 26a, 26b must be displaced rearwardly by a corresponding amount to provide a proper correction of the focal point.

In accordance with the invention, this correction takes place automatically as the diaphragm aperture is set. Specifically, when the diaphragm ring 34 is turned in a direction indicated by an arrow F about the optical axis to bring the diaphragm aperture to its fully open condition, the inclined slot 34a (see FIG. 13) formed in the diaphragm ring 34 will be shifted to a position 34aA shown in phantom line. The coupling pin 35 is fitted into the fork 36a integral with the distance ring 36, in the manner as shown in FIG. 14, and since the distance ring 36 remains immovable, the coupling pin 35 cannot move laterally. Consequently, as the diaphragm ring 34 is turned about the optical axis, the coupling pin 35 will be displaced to a position 35A shown in phantom line in FIG. 13, that is, to a position which is rearwardly displaced in the direction of the optical axis. Such rearward displacement of the coupling pin 35 accompanies a corresponding movement of its integral lens barrel 27, thereby causing a rearward movement of the lenses 26a, 26b to provide a correction of the focal point.

After the correction of the focal point is automatically performed in accordance with the change in the diaphragm value, the distance ring 36 may be turned for purpose of focussing onto an object being photographed. Then the interlocking pin 32 moves in the fore-and-aft direction in accordance with the configuration of the inclined groove 39, causing an angular movement of the rotatable mirror in the rangefinder through the interlocking mechanism shown in FIG. 2.

As the distance ring 36 is turned, the coupling pin 35 moves angularly together with the fork 36a. Such angular movement of the coupling pin 35 is constrained by the inclined slot 34a formed in the diaphragm ring 34, so that as the pin 35 moves, the taking lenses 36a, 36b move either forwardly or rearwardly in the direction of the optical axis for focussing purpose. In this manner, the rangefinder and the taking lenses are interlocked while maintaining a correction which is achieved depending on the diaphragm value.

The above description applies when the taking lenses have a negative spherical aberration. Where they have a positive spherical aberration, the correction may be made in the opposite direction with similar result.

Figure 1:
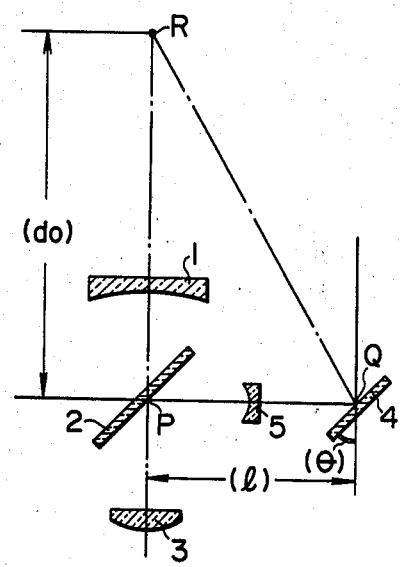
FIG. 1 is a schematic view of an optical system of a conventional rangefinder.

It should be understood that the invention is not limited to particular embodiments described above, but may be utilized in an arrangement in which the auxiliary lens 5 (see FIG. 1) is moved in interlocked relationship with the diaphragm value.

From the foregoing description, it will be appreciated that the invention enables the focal point to be effectively corrected by operating the rotatable mirror or the diaphragm ring in the imaging optics of a rangefinder camera.

It will be noted that in the embodiment shown in FIG. 11 where the focal point is corrected by the movement of the rotatable mirror, the rangefinder will be defocussed immediately after the correction has been made, but no difficultly results since the properly focussed image is formed on the film surface when an in-focus condition is reached as a result of a movement of the taking lenses which occurs by a focussing operation performed while viewing the rangefinder. For the embodiment shown in FIG. 12, the correction of the focal point is achieved by a usual operation of turning the diaphragm ring to establish a diaphragm aperture, thus dispensing with any special operation to achieve the optimum image. Hence, this arrangement will be very advantageous for practical purposes.

What is claimed is:

1. A focus correcting device for use in a rangefinder camera; the device comprising:
   imaging optics means including an apertured diaphragm and a focus adjusting mechanism;
   a rangefinder interlocked with finder optics means and including an optical system for determining a distance to an object being photographed;
   an interlocking mechanism providing an operational coupling between said rangefinder and said focus adjusting mechanism;
   correction means operationally connected to said focus adjusting mechanism to correct for a displacement of the focal point which occurs in response to a change in the diaphragm aperature of said apertured diaphragm;
   said rangefinder including a rotatable mirror, and said correction means including a correction member disposed in said interlocking mechanism which transmits a travel of the lens of said imaging optics means required for focussing to said rotatable mirror; and
   said correction member being adapted to move into or out of a transmission path which transmits the travel of the lens to the rotatable mirror to thereby define a start position for the angular movement of the rotatable mirror as the diaphragm aperture is changed.

2. A focus correcting device according to claim 1 in which a portion of the correction member which moves into or out of the transmission path is formed by a cam profile of a configuration corresponding to the optical response of the imaging optics.

3. A focus correcting device for use in a rangefinder camera; the device comprising:

imaging optics means including an apertured diaphragm and a focus adjusting mechanism;
a rangefinder interlocked with finder optics means and including an optical system for determining a distance to an object being photographed;
an interlocking mechanism providing an operational coupling between said rangefinder and said focus adjusting mechanism;
correction means operationally connected to said focus adjusting mechanism to correct for a displacement of the focal point which occurs in response to a change in the diaphragm aperture of said apertured diaphragm;
said correction means including a distance ring connected to a lens of said imaging optics means by coupling means for causing a movement of the lens for focussing, and
a diaphragm ring for establishing a particular diaphragm aperture of the apertured diaphragm, said diaphragm ring acting through said coupling means to cause a movement of the lens of said imaging optics means independently of the distance ring.

4. A focus correcting device according to claim 3 in which the distance ring is rotatable about the axis of the imaging optics to cause a movement of the latter, the distance ring being connected to the coupling pin by fitting the latter in a fork integral with the distance ring and extending in the direction of the optical axis of the imaging optics.

5. A focus correcting device according to claim 3 in which said diaphragm ring is rotatable about the optical axis of the imaging optics to adjust the apertured diaphragm to a particular aperture, the diaphragm ring being connected to the coupling pin by engaging the latter with an inclined slot formed in the diaphragm ring.

* * * * *